A. G. LEONARD.
LOCK.
APPLICATION FILED AUG. 30, 1920.
1,380,571.
Patented June 7, 1921.
2 SHEETS—SHEET 2.
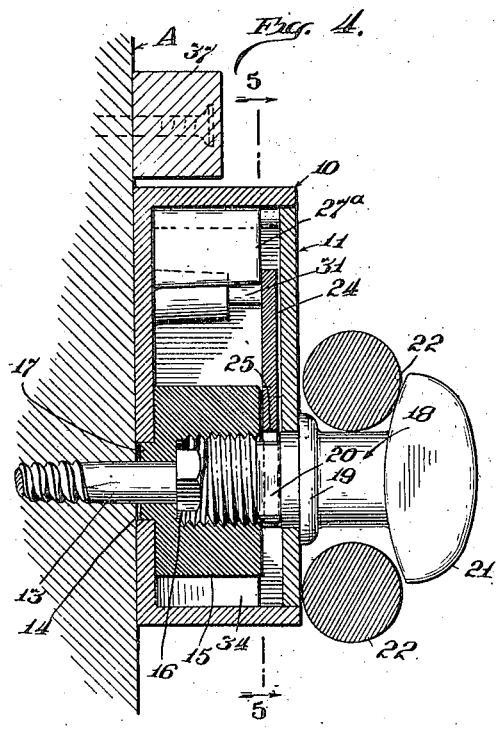
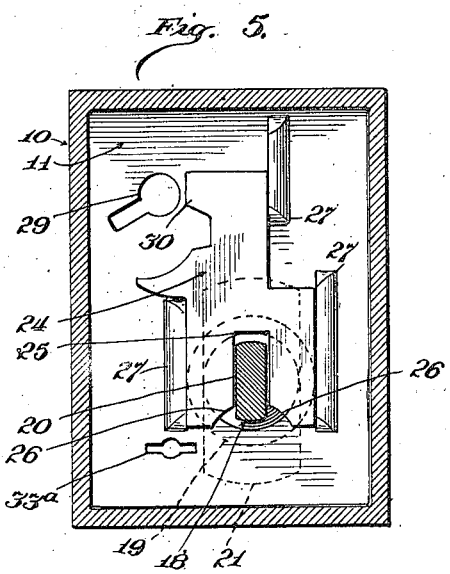
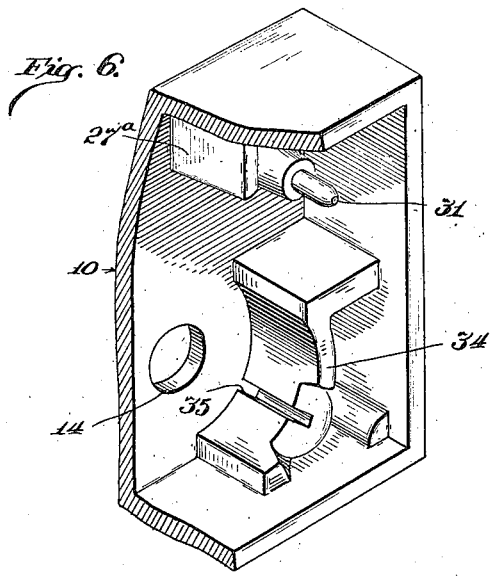
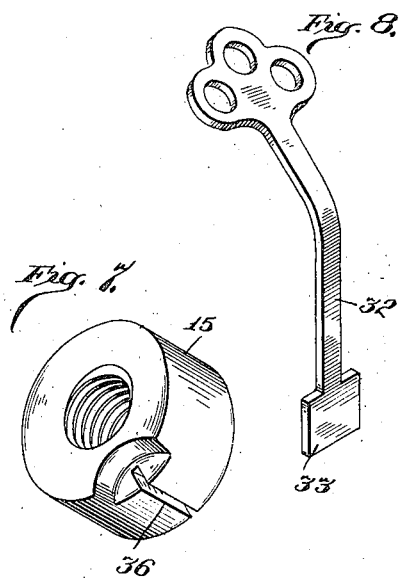
Inventor
Arthur G. Leonard.
Adams & Jackson
Attorneys
Witness
Milton Lenoir

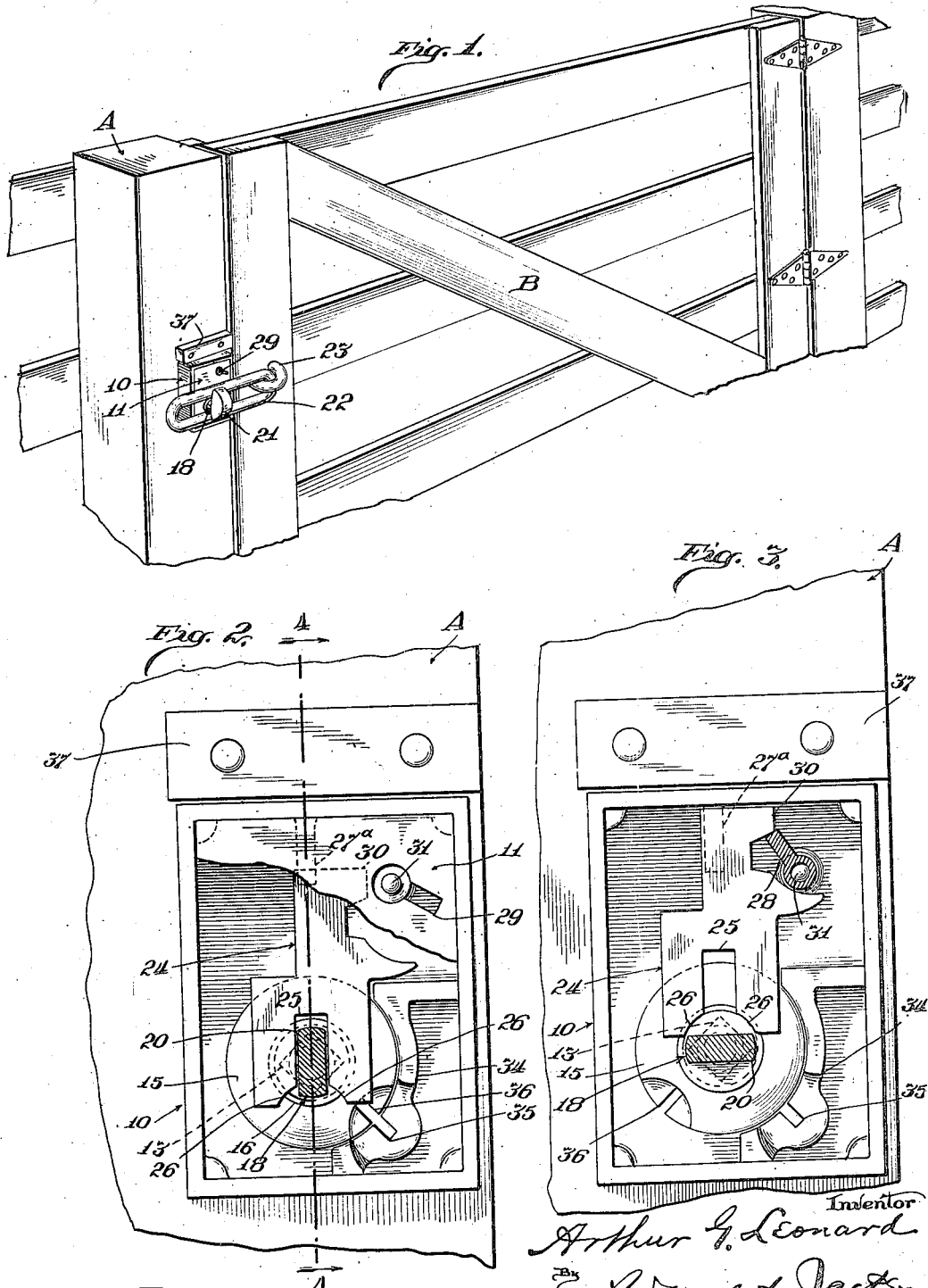

UNITED STATES PATENT OFFICE.

ARTHUR G. LEONARD, OF CHICAGO, ILLINOIS.

LOCK.

1,380,571.  Specification of Letters Patent.  Patented June 7, 1921.

Application filed August 30, 1920. Serial No. 406,833.

*To all whom it may concern:*

Be it known that I, ARTHUR G. LEONARD, a citizen of the United States, and a resident of Chicago, in the county of Cook and State of Illinois, have invented certain new and useful Improvements in Locks, of which the following is a specification, reference being had to the accompanying drawings.

This invention relates to improvements in locks and more particularly to locks designed for securing in closed position heavy gates, although, of course, applicable to other uses. In the large stock yards of the country there are thousands of cattle pens and paths which are closed by such gates, and it is frequently necessary to lock the same, but the locking means should be of a character that can be readily affixed in position, that will be strong and durable so as to withstand the rough usage to which they are subjected by the violent closing of the gates and the sudden shocks and strains that are put upon the gates by the pressure of animals against them. Furthermore, in order to prove satisfactory, locking devices for such situations must be adjustably secured in place so as to accommodate themselves to relative changes between the gates and the adjacent gate post due to the weight of the gates themselves or to weights imposed upon them. It is the object of my invention to provide a lock so constructed as to conform to these requirements and which shall be simple in construction, easily operated and not liable to get out of order. Briefly stated, I attain this object by attaching the casing of the lock to its support in such manner that said casing can be rocked when necessary to carry a headed stem that projects from the front wall of the lock into proper position so that when partially rotated it may be engaged by a link in the form of a loop that is carried by the gate, and also so securing the inner end of such stem that the stem will be effectually held against withdrawal from the lock-casing but will be permitted to freely turn so as to allow of the above-mentioned engagement of the looped member with its projecting headed end, the stem, after such partial rotation, being automatically locked in place, from which locking position it can be moved only by the use of a key. The means employed for attaining this object are shown in the drawings and hereinafter particularly described.

In the drawings,—

Figure 1 is a perspective view showing a gate in locked position, being so held by a locking means embodying my improvements;

Fig. 2 is a front elevation of a lock containing my invention, a portion of the front wall of the casing being broken away, and the tumbler being shown in locking engagement with the rotatable stem, which stem is shown in section;

Fig. 3 is a front elevation of the lock with the front wall removed, and the tumbler raised and resting upon the rotatable stem, which stem is shown in section as in Fig. 2, but rotated to a different position. The figure also shows in section a key employed to raise the tumbler;

Fig. 4 is a vertical section taken at line 4—4 of Fig. 3;

Fig. 5 is a vertical section taken at line 5—5 of Fig. 4;

Fig. 6 is a perspective view of the interior of the casing, the movable members of the lock being removed, and a portion of the casing being broken away;

Fig. 7 is a perspective view of the member rotatably mounted against the rear wall of the casing and which supports the inner end of the rotatable stem; and Fig. 8 is a perspective view of the device that is employed to hold the stem-supporting member against rotation when such stem is to be inserted in or withdrawn from the casing.

Referring to the several figures of the drawings,—10 indicates a lock casing, preferably rectangular in shape, and, in the construction shown, having its rear, side and end walls integral with each other, and its front wall, indicated by 11, being secured in place in any usual manner after the operative parts have been assembled. The casing is adapted to be affixed to a fence post or other fixed support adjacent to a gate opening, and is affixed, in the construction shown, by a single securing device, which, as shown, is a heavy lag-screw 13 that passes through an opening 14 in the rear wall of the casing. 15 is a heavy annular rotatable member provided in its front face with a deep socket 16, the annular wall of which is screw-threaded to receive the screw-threaded inner end of a rotatable stem described hereinafter. The rear face of this member 15 is provided centrally with an annular projection 17 that projects into the opening 14 in the rear wall of the casing and through such projection extends the lag-screw 13, the head of such lag-screw bearing against the end wall of the socket 16. By this arrangement the member 15 is free to rotate upon the unthreaded portion of the stem of the screw 13, and such screw performs the dual function of holding the casing to the post or other fixed support and also holding the member 15 in proper position in the casing. The post shown to which the casing is affixed is indicated by A.

18 indicates the stem before referred to, whose inner end is screw-threaded, as clearly shown in Fig. 4, to adapt it to be screwed into the socket 16 of the rotatable supporting member 15, and such screw-threaded engagement is to be tight enough so that unless the supporting member 15 is restrained, as hereinafter described, from rotation it will turn with the stem. 19 indicates a collar formed on the stem and adapted to come against the front face of the front wall of the casing and thus limit the extent to which the stem can be screwed into the supporting member 15. The stem, as shown, is cylindrical in form except that for a short distance immediately in front of its screw-threaded portion it is narrowed and flattened to form a neck portion 20 having two flat parallel faces, as clearly shown in Figs. 2 and 3. On the outer end of the stem is provided an elongated head 21 that extends in opposite directions from the stem, the width of such head being substantially equal to the diameter of the stem. So constructing the head permits it when in one position to extend through a link or slotted device and when turned in another direction to lie across the slot or link so as to prevent disengagement of the parts. A link such as referred to is best shown in Fig. 1, and is indicated by 22, the link being held in place, in the construction shown, by a staple 23 driven in and secured to the end bar of a hinged gate, here indicated by B.

Within the casing and lying adjacent to the front wall 11 thereof is a tumbler 24 the lower portion of which is bifurcated by the formation of a slot 25, which slot is of a size and shape to adapt it to pass over and engage the flat sided neck portion 20 of the stem when the stem is turned as in Fig. 2. The lower edge of the tumbler at each side of the slot 25 is preferably rounded or curved, as at 26, to normally loosely rest upon the neck portion when the tumbler is raised and the stem is turned as in Fig. 3. Thus engaging the stem as in this Fig. 3, the tumbler will not interfere with the turning of the stem and will be in position to immediately drop over the stem as in Fig. 2 when the stem has been turned to the position shown in that figure. The tumbler is guided in its vertical movements by guide strips 27 (see Fig. 5) on the inner face of the closure member 11 of the casing and preferably formed integral with such member, and by a guide 27$^a$ against whose front edge the rear face of the tumbler moves. The tumbler is raised to permit the turning of the stem by means of a key 28 that is insertible through a keyhole 29 in the front wall 11 of the casing, the key engaging a laterally projecting lip 30 at the upper end of the tumbler, as clearly shown in Fig. 3. 31 indicates a fixed post projecting from the rear wall of the casing, which post is engaged by the key and serves as a support therefor when the key is being rotated, as usual.

In view of the tight fit of the screw-threaded inner end of the stem 18 in the socket of the support 15 it is necessary to make provision for holding such member 15 against rotation when the stem is screwed into or out of such socket, and to that end I have provided a member 32 formed of a comparatively thin piece of sheet metal, the inner end of which is enlarged to form a thin flat head 33. This device is adapted to be inserted through an opening 33$^a$ in the front wall 11 of the casing, such opening being of a size and shape to permit the passage of the head 33 therethrough. 34 indicates a fixed bracket within the casing, and preferably made integral with the casing, the face of which bracket is curved to correspond to the surface of the supporting member 15, as clearly shown in Figs. 2 and 3, such curved face lying quite close to said member 15. In this curved face of the bracket is formed a groove 35, and in the outer face of the rotatable supporting member 15 is formed a similar groove 36, which latter groove, when brought into alinement with the groove 35 presents, in effect, a slot of a size and shape to receive the head 33, and when such head is so inserted the effect, of course, will be to lock the member 15 against rotation, and thus permit the independent rotation of the stem 18 either to insert it in the socket in the support or withdraw it therefrom.

Attention has been called to the fact that the casing as a whole is held in place by a single lag-screw 13, and by reason of being so supported it is evident that the casing can be rocked laterally, and such rocking is desirable in that it permits the head 21 of the rotatable stem to be properly positioned so that the link 22 may be passed over it even though the point of attachment of the link to the gate should not be in direct horizontal alinement with the stem. While it is intended to have the link secured in such direct alinement this intention will at times be defeated by carelessness in driving in the staple 23 at the right place or by reason of a sagging of the gate. Of course, it is not feasible to permit more than a limited amount of sidewise turning or rocking of the casing, and, therefore, I have provided a stop to limit such movement of the casing, such stop being in the form, in the construction shown, of a short bar 37 securely affixed to the post A a slight distance above the top of the casing, as clearly shown in Figs. 1 and 4. While my lock is, of course, practical and effective even when the casing is secured against sidewise movement, yet its usefulness is materially increased by providing for a limited amount of sidewise swing, for the reason stated.

What I claim as my invention and desire to secure by Letters Patent, is—

1. A lock comprising in combination a casing, means for securing the casing to a fixed support and that also permits the casing to be freely moved relative to its support, and a rotatable stem projecting from the casing for engagement by a member not connected with the casing.

2. A lock comprising in combination a casing, means for securing the casing to a fixed support and that also permits the casing to be rocked laterally, and a rotatable stem projecting from the casing for engagement by an apertured member not connected with the casing.

3. A lock comprising in combination a casing, means for securing the casing to a fixed support and that also permits the casing to be rocked laterally, means for limiting the extent of such rocking, and a rotatable stem projecting from the casing for engagement by an apertured member not connected with the casing.

4. A lock comprising in combination a casing, means for pivotally securing the casing to a fixed support, and a rotatable stem projecting from the casing for engagement by a member not connected with the casing.

5. A lock comprising in combination a casing, means for pivotally securing the casing to a fixed support, and a rotatable stem projecting from the casing and provided with an elongated head adapted in one position of the bolt to pass freely through an opening in a member not connected with the casing and in another position to extend across such opening.

6. A lock comprising in combination a casing, a bolt for pivotally securing the casing to a fixed support, a rotatable stem projecting from the casing having means on its projecting portion for interlocking with a member not connected with the casing, and a support for the inner end of said stem rotatably mounted on the said casing-securing bolt.

7. A lock comprising in combination a casing, a bolt for pivotally securing the casing to a fixed support, a rotatable stem projecting from the casing having means on its projecting portion for interlocking with a member not connected with the casing, and a support for the inner end of said stem mounted on the said casing-securing bolt and rotatable with said stem.

8. A lock comprising in combination a casing, a bolt for pivotally securing the casing to a fixed support, a rotatable stem projecting from the casing having means on its projecting portion for interlocking with a member not connected with the casing, and a support for the inner end of said stem mounted on said casing-securing bolt, said support being affixed to said stem so as to rotate therewith but preventing withdrawal of the stem from the casing.

9. A lock comprising in combination a casing, a bolt for pivotally securing the casing to a fixed support, a rotatable stem projecting from the casing having means on its projecting portion for interlocking with a member not connected with the casing and having its inner end portion screw-threaded, and a support for the inner end of said stem mounted on said casing-securing bolt, said support being screwed to the stem so as to rotate therewith but preventing withdrawal of the stem from the casing.

10. A lock comprising in combination a casing, a rotatable stem projecting from the casing and having means on its projecting portion for interlocking with a member not connected with the casing, a rotatable support provided in its front face with a socket into which the inner end portion of the stem extends and in which socket such stem is removably secured so that the support will rotate with the stem, and a securing bolt extending through the rear wall of the casing with its head located in said socket.

11. A lock comprising in combination a casing, a bolt for pivotally securing the casing to a fixed support, a rotatable stem projecting from the casing having means on its projecting portion for interlocking, after a partial rotation of the stem, with a member not connected with the casing, means for automatically engaging the stem to hold it against further rotation after such interlocking has been effected, and a support for the inner end of said stem rotatably mounted on the said casing-securing bolt.

12. A lock comprising in combination a casing, means for securing the casing to a fixed support but permitting the casing a lateral rocking movement, a rotatable stem projecting from the casing having means on its projecting portion for interlocking, after a partial rotation of the stem, with a member not connected with the casing, and means for automatically engaging with the stem to hold it against further rotation after such interlocking has been effected.

13. A lock comprising in combination a casing, means for securing the casing to a fixed support but permitting the casing a lateral rocking movement, a rotatable stem projecting from the casing and provided with an elongated head adapted in one position of the stem to pass freely through an opening in a member not connected with the casing and after a partial rotation of the stem to extend across such opening, and means for automatically engaging the stem to hold it against further rotation after such partial rotation has been completed.

14. A lock comprising in combination a casing, a rotatable stem projecting from the casing and having means on its projecting portion for interlocking, after a partial rotation of the stem, with a member not connected with the casing, a rotatable support with which the inner end of the stem is in detachable engagement, and means for automatically engaging the stem to hold it against further rotation after such interlocking has been effected.

15. A lock comprising in combination a casing, a rotatable stem projecting from the casing and having means on its projecting portion for interlocking, after a partial rotation of the stem, with a member not connected with the casing, the portion of the stem within the casing having a flattened face, and a sliding member loosely resting against said stem so as not to restrain the rotation thereof and adapted to automatically engage said flattened face upon the completion of said partial rotation to prevent further rotation of the stem.

16. A lock comprising in combination a casing, a rotatable stem projecting from the casing and having means on its projecting portion for interlocking, after a partial rotation of the stem, with a member not connected with the casing, the portion of the stem within the casing having a flattened face, and a sliding tumbler normally resting upon said stem during the time the stem is not in its said interlocking position and permitting said stem to be freely rotated into such interlocking position, said tumbler being automatically movable into engagement with such flattened face upon the completion of said partial rotation.

17. A lock comprising in combination a casing, a rotatable stem projecting from the casing and having means on its projecting portion for interlocking, after a partial rotation of the stem, with a member not connected with the casing, the portion of the stem within the casing having a flattened face, and a slotted tumbler normally resting upon said stem and permitting a rotative movement thereof but automatically movable upon the completion of said partial rotation to cause the flattened portion of the stem to enter the slot in the tumbler.

18. A lock comprising in combination a casing, a rotatable stem projecting from the casing and having means on its projecting portion for interlocking, after a partial rotation of the stem, with a member not connected with the casing, a rotatable support with which the inner end of the stem has screw-threaded connection, and means for holding said support stationary to permit the stem to be turned relatively thereto.

19. A lock comprising in combination a casing, a rotatable stem projecting from the casing and having means on its projecting portion for interlocking, after a partial rotation of the stem, with a member not connected with the casing, a rotatable support with which the inner end of the stem has screw-threaded connection, a stationary member adjacent to said support, said support and member each being provided with an opening to receive, when in alinement, a member inserted through a wall of the casing and hold the support stationary.

20. A lock comprising in combination a casing, a rotatable stem projecting from the casing and having means on its projecting portion for interlocking, after a partial rotation of the stem, with a member not connected with the casing, said stem having a flattened side portion, and a tumbler located over and resting upon said stem and adapted, upon a partial rotation of the stem, to slide down against said flattened portion of the stem, said tumbler acting to restrain rotation of the stem only while the stem is in its said interlocking position.

ARTHUR G. LEONARD.